W. H. NAUMAN & E. F. STODDARD.
Seeding-Machine.
No. 215,387. Patented May 13, 1879.
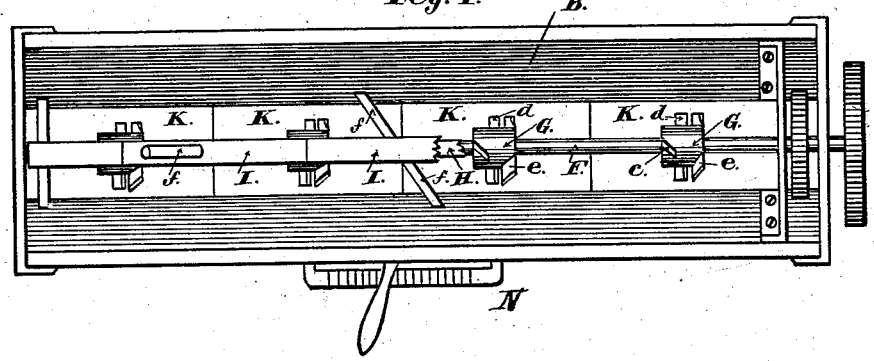
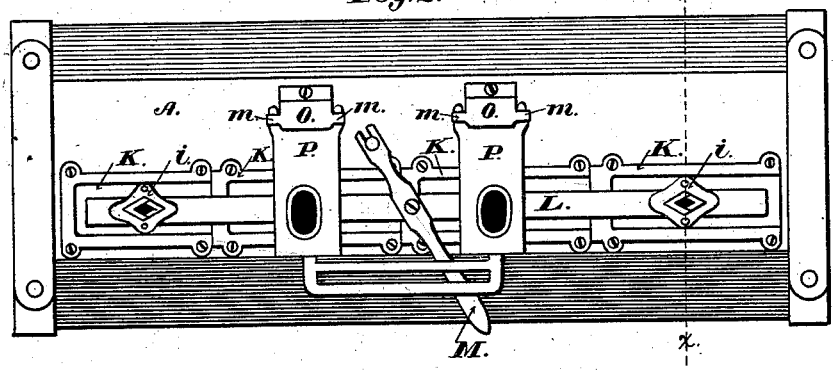
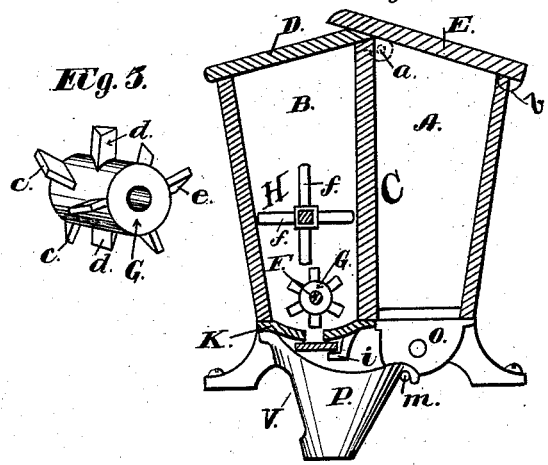
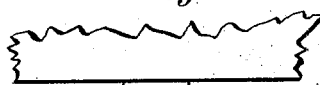
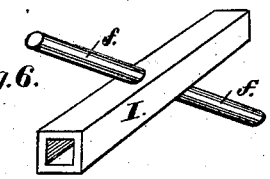
Witnesses:
Chas. M. Peck
Quincy Corwin
Inventors
William H. Nauman
E. Fowler Stoddard
by Peck & Ritchie
their Attys.

UNITED STATES PATENT OFFICE.

WILLIAM H. NAUMAN AND E. FOWLER STODDARD, OF DAYTON, OHIO.

IMPROVEMENT IN SEEDING-MACHINES.

Specification forming part of Letters Patent No. 215,387, dated May 13, 1879; application filed August 6, 1878.

*To all whom it may concern:*

Be it known that we, WILLIAM H. NAUMAN and E. FOWLER STODDARD, of Dayton, in the county of Montgomery and State of Ohio, have invented certain new and useful Improvements in Seeding-Machines; and we do hereby declare the following to be a full, clear, and exact description of the same.

This invention relates to that class of grain-drills which are provided with additional hoppers for sowing guano or other fertilizers; and our object is to provide a simple, durable, and efficient fertilizing attachment.

The novelty of our invention consists in the construction and arrangement of the several devices, as will be herewith set forth and specifically claimed.

In the accompanying drawings, Figure 1 represents a plan view of a fertilizer-hopper provided with our improvements. Fig. 2 is a bottom plan view of both the fertilizer and the grain hoppers. Fig. 3 is a sectional view in side elevation through the line $x$ $x$ of Fig. 2. Fig. 4 is a rear elevation of one of the seeding-spouts. Fig. 5 is a perspective view of our improved feed-wheel. Fig. 6 is a perspective view of one of our sleeved sections.

Corresponding letters of reference indicate like parts in all the figures.

A and B are respectively the grain and fertilizer hoppers, of the usual or any suitable construction, having end pieces in common and separated by a division-wall, C. Double hoppers of this description usually have separate inclined lids, so as to shed water, and in order to form a tight joint along their contiguous edges various joint-pieces and other extraneous devices are used. We improve upon such construction by hinging the lid D of the hopper B at the apices of the end pieces at $a$, Fig. 3, and beveling its edge whereon the opening edge of the lid E of the hopper A, hinged at $b$, rests and projects slightly, as indicated. By this arrangement a perfect water-shed is provided in the simplest manner.

By reference to Figs. 1, 3, 5, and 6, the construction and arrangement of our fertilizer agitating and feeding devices are clearly seen. Upon a shaft, F, running longitudinally through the hopper near its bottom, and rotated by gearing connecting it with the driving-wheels, in the usual manner, we place at equal distances and just over the discharge-outlets the feed-wheels G. These latter are short metal cylinders, from whose surface three rows of teeth, $c$, $d$, and $e$, project at equal intervals. The outer rows of these teeth are inclined, as seen in Fig. 1, so that in revolving they tend to force the fertilizing material to the discharge-outlets, which are centrally located under them. The central rows of teeth, $d$, are bayonet-shaped or triangular, so as to present a cutting-edge as the wheels revolve. Just above the shaft F is a second shaft, H, preferably square in section, and rotated by gearing connecting it in any suitable manner with the shaft F. Upon this shaft H are slipped the hollow sections I, which are square sleeves, each of which has projecting from it, on opposite sides, inclined tines or fingers $f$, as represented. These fingers form stirrers or agitators, which, revolving in the mass of fertilizing material, serve to comminute it and prevent its bridging or adhering in lumps. By making the sleeves in sections, each provided with stirrers, they can be easily replaced when broken without necessitating a whole new shaft. The same purpose could be accomplished by dispensing with the central shaft, H, and making the sections either solid or hollow, and connecting them end to end by suitable joint-connections.

An essential feature of our invention is the bottom of the hopper, which is composed entirely of metallic sections K, Figs. 1, 2, and 3. These sections are rectangular pieces, dish-shaped, and secured upon the under side of the hopper, with their ends abutting or overlapping. In each, at its center or lowest portion, is a discharge-outlet, preferably of lozenge shape, directly under each of the wheels G. These sections, as before stated, form the bottom of the hopper, and can be removed or replaced when broken, or for any other purpose, without removing the entire bottom.

If desired, more than one outlet can be formed in each section, thereby diminishing their number, though we prefer the construction indicated.

Upon lugs on the under side of each of the sections we secure the lozenge-shaped frames

*i*, between which and the bottom of the sections is located the cut-off slide L, perforated with openings corresponding with the discharge-outlets. This slide is shifted horizontally to open or close the discharge-outlets by means of a lever, M, and graduated index-plate N, in the usual way.

O O, Figs. 2 and 3, are the grain-wheel cases, of any suitable construction, arranged on the under side of the hopper A. These cases have projecting ears *m* on their lower sides, upon which, and attached to the rear edge of the hopper B, the receiving-spouts P are hung, as represented. These spouts, as seen in Figs. 3 and 4, have openings *v* in their rear sides, by means of which the attendant is enabled to see that the grain or fertilizer is constantly flowing.

Having thus fully described our invention, we claim as follows:

1. In a seeding-machine, the hopper-lids, hinged as shown, and overlapping each other, as and for the purpose specified.

2. The feed-wheels G, provided with three rows of teeth, of which the outer rows are inclined and the middle row triangular in shape, as and for the purpose specified.

3. The hopper-bottom composed of metallic sections abutting or overlapping each other, and provided with discharge-outlets, as and for the purpose specified.

Witness our hands this 30th day of July, A. D. 1878.

WM. H. NAUMAN.
E. FOWLER STODDARD.

Witnesses:
 CHAS. M. PECK,
 P. H. GUNCKEL.